(12) United States Patent
Otero et al.

(10) Patent No.: US 9,094,693 B1
(45) Date of Patent: Jul. 28, 2015

(54) DISSEMINATION OF VIDEO FILES TO MOBILE COMPUTING DEVICES OVER A COMMUNICATIONS NETWORK

(71) Applicant: IP-COM, LLC, Miramar, FL (US)

(72) Inventors: Andres Otero, Doral, FL (US); Rodrigo Guzman, Miramar, FL (US); Alvaro Ramirez, Miami, FL (US)

(73) Assignee: IP-Com, LLC, Miramar, FL (US)

( * ) Notice: Subject to any disclaimer, the term of this patent is extended or adjusted under 35 U.S.C. 154(b) by 0 days.

(21) Appl. No.: 14/566,057

(22) Filed: Dec. 10, 2014

(51) Int. Cl.
| | |
|---|---|
| *H04N 7/16* | (2011.01) |
| *H04N 21/2343* | (2011.01) |
| *H04W 4/18* | (2009.01) |
| *H04N 21/61* | (2011.01) |
| *H04N 21/2187* | (2011.01) |
| *H04N 7/14* | (2006.01) |
| *H04N 21/218* | (2011.01) |
| *H04N 21/258* | (2011.01) |

(52) U.S. Cl.
CPC ......... *H04N 21/23439* (2013.01); *H04N 7/148* (2013.01); *H04N 21/2187* (2013.01); *H04N 21/21815* (2013.01); *H04N 21/25833* (2013.01); *H04N 21/25891* (2013.01); *H04N 21/6131* (2013.01); *H04W 4/18* (2013.01)

(58) Field of Classification Search
CPC .............. G06Q 30/02; G06Q 30/0247; G06Q 30/0267; G06Q 30/0269; G06Q 30/0275; G06Q 30/0255; G06Q 30/0261; G06Q 30/0273; G06Q 30/0254; G06Q 30/0243; H04M 3/42
See application file for complete search history.

(56) References Cited

U.S. PATENT DOCUMENTS

| | | | |
|---|---|---|---|
| 2002/0016964 A1* | 2/2002 | Aratani et al. | 725/39 |
| 2006/0031883 A1* | 2/2006 | Ellis et al. | 725/58 |
| 2006/0174307 A1* | 8/2006 | Hwang et al. | 725/132 |
| 2006/0253874 A1* | 11/2006 | Stark et al. | 725/62 |
| 2008/0022335 A1* | 1/2008 | Yousef | 725/100 |
| 2008/0127257 A1* | 5/2008 | Kvache | 725/39 |
| 2009/0031301 A1* | 1/2009 | D'Angelo et al. | 717/178 |
| 2010/0142447 A1* | 6/2010 | Schlicht et al. | 370/328 |
| 2012/0010955 A1* | 1/2012 | Ramer et al. | 705/14.46 |
| 2014/0019540 A1* | 1/2014 | Shin et al. | 709/204 |
| 2014/0032684 A1* | 1/2014 | Chung et al. | 709/206 |

* cited by examiner

*Primary Examiner* — Oleg Asanbayev
*Assistant Examiner* — Christine Kurien
(74) *Attorney, Agent, or Firm* — Mark Terry

(57) ABSTRACT

A server for disseminating a video file to mobile subscriber over a mobile communications network is disclosed. The server comprises a processor programmed for storing a record for each mobile subscriber, defining a criteria for selecting mobile subscribers for videos, wherein said criteria is based on data from a record for a mobile subscriber, selecting a group of mobile subscribers by identifying the records that match said criteria, generating, for each mobile subscriber of the group, a video message in a format that corresponds to the operating system indicator and the video format indicator for said mobile subscriber, and transmitting a video message to the mobile phone number in the record, wherein the video message is transmitted according to the method of access indicator for said mobile subscriber.

4 Claims, 5 Drawing Sheets

DISSEMINATION OF VIDEO FILES TO MOBILE COMPUTING DEVICES OVER A COMMUNICATIONS NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates generally to the field of telecommunications and, more specifically, the present invention relates to the field of disseminating information and data over a telecommunications network.

BACKGROUND

The use of video on computing devices has been around since the personal computer emerged into the mainstream in the 1980s. But the use of video on mobile computing devices took longer to become feasible, since mobile devices did not have the requisite computing power and wireless networks did not initially have enough bandwidth to allow for wide use of video on mobile devices. Only recently, due to the increased bandwidth available on wireless networks and higher smart phone adoption rates, has the use of video on mobile devices become widespread. Today, the use of video on mobile computing devices has become ubiquitous, with the grand majority of all mobile phone users worldwide, or 2.4 billion out of 3.3 billion phone subscribers, actively engaging with video on their devices. Video is most often used by private mobile phone users for recreational or entertainment purposes, as well as for personal communications. But the use of video for business purposes has further grown significantly in recent years.

One common problem with the use of video on mobile computing devices, however, is the time necessary to access and execute video files. Typically, a user who intends to send a video file must open a separate application or computer program to select the video for transmission, to select the recipient of the video file and then input a command to send the video to the recipient. This may take the user a significant amount of time to execute, while the recipient waits. Then, the recipient of the video must open a separate application or computer program to select the video for play, and then input a command to play the video. This can be burdensome and time consuming for the recipient of the video. The fast pace of communications today requires a faster method of sending and receiving video files between mobile phones or computing devices over a communications network. Another common problem with the use of video on mobile computing devices involves compatibility. The mobile computing device market is currently dominated by at least three different operating systems and various video file formats. Sometimes, a video file in one format or for one operating system may not be played on another operating system or with a player that doesn't support a particular video file format. This can be frustrating and unsatisfying for users.

Therefore, what is needed is a system and method for improving upon the problems with the prior art, and more particularly for a more efficient way of communicating video files over a communications network.

SUMMARY

According to the aspects illustrated herein, a server for disseminating a video file to a plurality of mobile subscribers over a mobile communications network is disclosed. The server comprises a database for storing video files and records for mobile subscribers, a memory storage, a network connection device communicatively coupled with the mobile communications network and a processor communicatively coupled with the database, the memory storage and the network connection device. The processor is programmed for storing in an attached database a record for each of the plurality of mobile subscribers, wherein said record includes at least a user name, a mobile phone number, an operating system indicator, a video format indicator and a method of access indicator, defining a criteria for selecting mobile subscribers for receiving one of more videos from the database, wherein said criteria is based on data from a record for a mobile subscriber, selecting a group of mobile subscribers from the plurality of mobile subscribers by identifying the records of said mobile subscribers that match said criteria, generating, for each mobile subscriber of the group of mobile subscribers, a video message in a format that corresponds to the operating system indicator and the video format indicator in the record for said mobile subscriber, such that a plurality of video messages are generated, and transmitting, to each mobile subscriber of the group of mobile subscribers, via the mobile communications network, a corresponding video message of the plurality of video messages to the mobile phone number in the record for said mobile phone subscriber, wherein the video message is transmitted according to the method of access indicator in the record for said mobile subscriber.

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
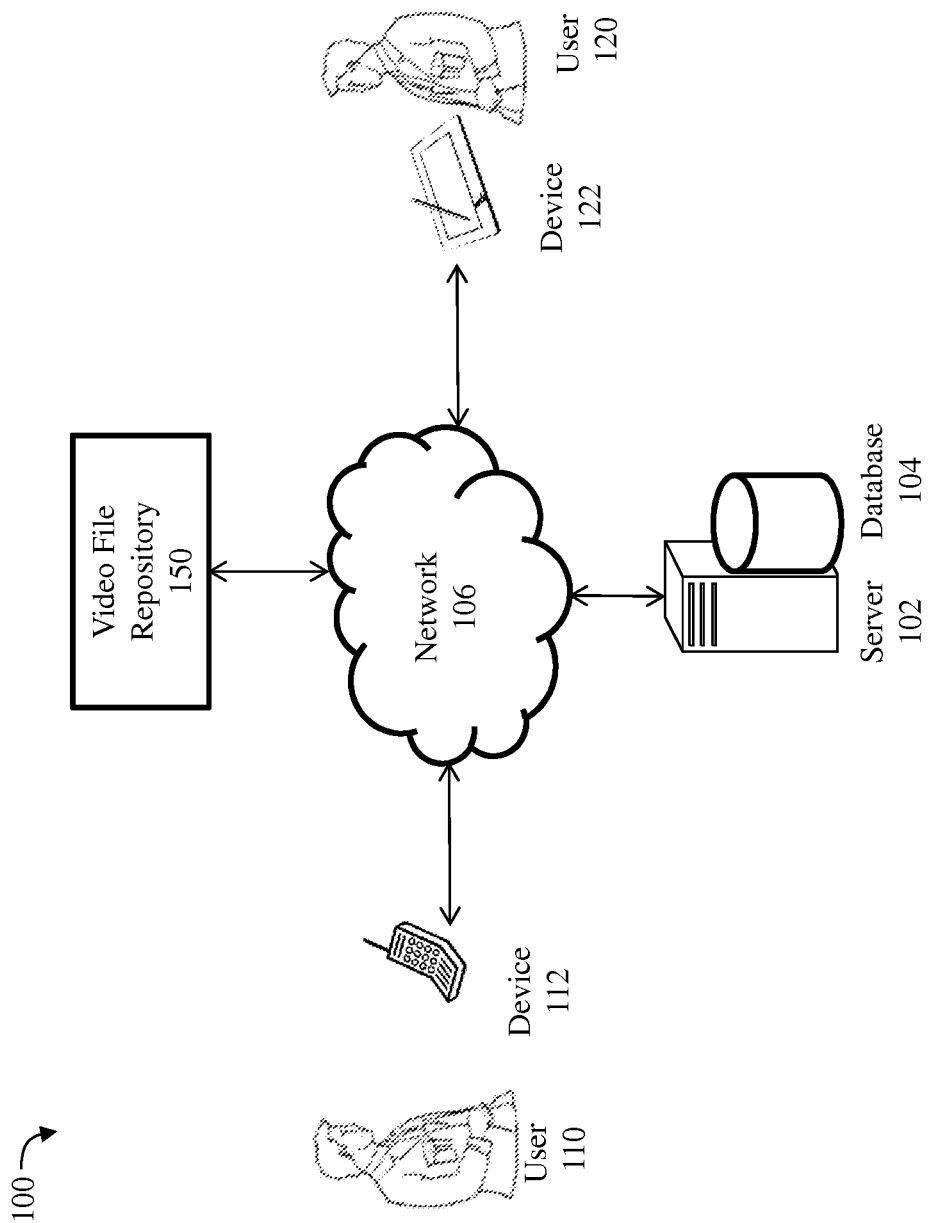
FIG. 1 is a block diagram illustrating a network architecture of a system for disseminating a video file to a plurality of mobile subscribers over a mobile communications network, in accordance with one embodiment.

The following detailed description refers to the accompanying drawings. Wherever possible, the same reference numbers are used in the drawings and the following description to refer to the same or similar elements. While the disclosed embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosed embodiments. Instead, the proper scope of the disclosed embodiments is defined by the appended claims.

The disclosed embodiments improve upon the problems with the prior art by providing a system and method for allowing the quick and easy transmission of video files over a mobile telecommunications network. Further, the disclosed embodiments allow for video files to be disseminated to mobile subscribers via the method and format that corresponds specifically to each mobile subscriber. That is, video files are automatically customized to the native format of each mobile subscriber that receives a video file. This alleviates the problems with the prior art, namely, video files in one format or for one operating system not being compatible on another operating system or with a player that doesn't support a particular video file format, which can be frustrating and unsatisfying for users. The disclosed embodiments further improve upon the problems with the prior art by providing a system and method that reduces or eliminates the number of separate applications or computer programs that must be opened and commanded by senders and recipients of said video files. Lastly, the disclosed embodiments allow senders of video files to automatically send compatible video files to a selected group of mobile subscribers in a fast and user-friendly manner.

Referring now to the drawing figures in which like reference designators refer to like elements, there is shown in FIG. 1 an illustration of a block diagram 100 showing the network architecture of a system for disseminating a video file to a plurality of mobile subscribers over a mobile communications network.

A prominent element of FIG. 1 is the server 102 associated with repository or database 104 and further coupled with network 106, which can be a mobile telecommunications network, defined as a wireless network distributed over a land area. The wireless network may be connected to telephone exchanges (or switches), which in turn connect to the Public Service Telephone Network (PSTN). Network 106 may further be a circuit switched network, or a packet switched network, such as the Internet or the World Wide Web, the global telephone network, a cellular network, a mobile communications network, or any combination of the above. Server 102 is a central controller or operator for functionality of the disclosed embodiments, namely, facilitating dissemination of a video file to a plurality of mobile subscribers over a mobile communications network 106.

FIG. 1 includes mobile computing devices 112 and 122, which may be smart phones, mobile phones, tablet computers, handheld computers, laptops, or the like. Computing devices 112 and 122 correspond to users 110 and 120, who may be any user of a computing device. Users 110 and 120 may also be referred to as mobile subscribers.

FIG. 1 further shows that server 102 includes a database or repository 104, which may be a relational database comprising a Structured Query Language (SQL) database stored in a SQL server or a big data database. Devices 112, 122 may also each include their own database. The repository 104 serves data from a database, which is a repository for data used by server 102 and devices 112, 122 during the course of operation of the disclosed embodiments. Database 104 may be distributed over one or more nodes or locations that are connected via network 106.

The database 104 may include a user record for each user 110 or 120. A user record may include: contact/identifying information for the user (name, address, telephone number(s), email address, date of birth, social security number, a photo, etc.), a user address identifier (such as an email address, text message address, UseNet address, mobile phone number, etc), etc. A user record may also include a unique identifier for each user, a residential address for each user, the current location of each user (based on location-based services from the user's mobile computer) and demographic data for each user, such as age, sex, income data, race, color, marital status, etc.

The database 104 may include a mobile subscriber record for each user 110 or 120. A mobile subscriber record may include a unique identifier, a user name, a mobile phone number, an operating system indicator, a video format indicator, an email address for the mobile subscriber and a method of access indicator. An operating system indicator may indicate the operating system of the mobile phone, such as the well-known iOS, Android and Windows 8 operations systems for mobile devices. A video format indicator may indicate the format of the video file supported by the mobile device, such as MPEG-4, V8 and V9. A method of access indicator defines whether the video file shall be disseminated using push or pull technology. Push technology describes a style of Internet-based communication where the request for the video file is initiated by the server 102. Pull technology is a style of network communication where the initial request for the video file originates from the mobile device, and then is responded to by the server 102.

The mobile subscriber record may also include the protocol for delivering the video file to the mobile device (Such as IP, VoIP, etc.) of the mobile subscriber, video and audio codecs used by the mobile device (such as H.264 or AAC-ELD), the signaling communications protocol for setting up a connection between the server 102 and the mobile device (such as SIP), the security protocol for connecting to the mobile device (such as STUN, TURN, and ICE), and any protocols for delivering real time and encrypted media streams (such as RTP, and SRTP). The mobile subscriber record may also include the native video chat platform of the mobile device (such as Apple FaceTime or Google Hangouts or Microsoft Skype), the manufacturer of the mobile device, the industry sector of the mobile subscriber, the country/state/region of the mobile subscriber, the resolution of the video file that is supported by the mobile device, and the like. In one embodiment a video chat platform may be an interactive video chat platform wherein a user interacts with an automated system, much like an interactive voice response system for audio calls.

A mobile subscriber record may also include data relating to previous calls made to a mobile subscriber during the process of disseminating video files to users 110, 120. See the written description of FIG. 2 for a more detailed account of the process of disseminating video files to users. Previous calls to a mobile phone number may generate information that may be used at a later time when deciding whether to call the same number (as in steps 208 and 210). For example, during a previous call to a particular mobile phone number, the caller may reach a message or signal from an operator or interactive voice response system indicating that the mobile phone number is out of service, suspended, not a mobile phone number or a variety of other information. This data may affect whether the system 100 calls the same phone number at a later time (as in steps 208 and 210). Therefore, said data is captured and stored in the mobile subscriber record in the database 104.

A mobile subscriber record may also include home location register (HLR) data relating to additional mobile subscriber data about users 110, 120. HLR data may be collected from the telecommunications provider (or mobile phone/cellular service provider) 340 of the mobile subscriber. HLR data may affect whether the system 100 calls the same phone number at a later time (as in steps 208 and 210). Therefore, said data is also captured and stored in the mobile subscriber record in the database 104.

The home location register (HLR) is a central database that contains details of each mobile phone subscriber that is authorized to use the mobile telecommunications network. There can be several logical, and physical, HLRs per mobile network. The HLRs store details of every SIM card issued by the mobile phone operator. Each SIM has a unique identifier called an IMSI which is the primary key to each HLR record. Another important item of data associated with the SIM are the MSISDNs, which are the telephone numbers used by mobile phones to make and receive calls. The primary MSISDN is the number used for making and receiving voice calls and SMS, but it is possible for a SIM to have other secondary MSISDNs associated with it for fax and data calls. Each MSISDN is also a primary key to the HLR record. Examples of other data stored in the HLR against an IMSI record are: a mobile subscriber's identity; GSM services that the subscriber has requested or been given; GPRS settings to allow the subscriber to access packet services; current location of subscriber; and call divert settings applicable for each associated MSISDN.

In one embodiment, database 104 holds at least 5 million mobile subscriber records. This number of records is significant in the industry because it represents a minimum number of mobile subscribers that are present in a typical medium to large sized urban area, and it represents a minimum number of advertising viewers that must be targeted in an mobile device advertising campaign in order to make the costs of said advertising campaign cost feasible. I.e., said number of mobile subscribers are necessary in order to provide an acceptable return on investment on said mobile device advertising campaign.

The database 104 may also include a record for each video file. The record may include the video file itself. The video file record may also include a unique identifier and metadata about the video file, such as a video format indicator, video and audio codecs, the resolution of the video file, size of the file, native file format, etc.

FIG. 1 shows an embodiment wherein networked computing devices 112, 122 interact with server 102 and repository 104 over the network 106 in the course of engaging with videos. Server 102 includes a software engine that delivers applications, data, video files, audio files, program code and other information to networked computing devices 112, 122. It should be noted that although FIG. 1 shows only the networked computers 102, 112, 122, the system of the disclosed embodiments supports any number of networked computing devices connected via network 106. Further, server 102 and devices 112, 122 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

FIG. 1 also shows a video file repository 150 which stores a plurality of video files. Entity 150 may be a third party entity or may be a part of, or controlled by, the same entity that controls or operates the server 102. The video files stored at entity 150 may be used or accessed by the server 102 when it disseminates the video files to mobile devices 112, 122 according to the disclosed embodiments. In one embodiment, entity 150 is a third party entity that plays the role of an advertiser and server 102 plays the role of an advertising service provider that disseminates entity 150's video files to mobile devices 112, 122 at the direction and according to the instructions of entity 150.

Note that although server 102 is shown as a single and independent entity, in one embodiment, the functions of server 102 may be integrated with another entity, such as one of the devices 112, 122 or entity 150. Further, server 102 and its functionality, according to a preferred embodiment, can be realized in a centralized fashion in one computer system or in a distributed fashion wherein different elements are spread across several interconnected computer systems.

Figure 2:
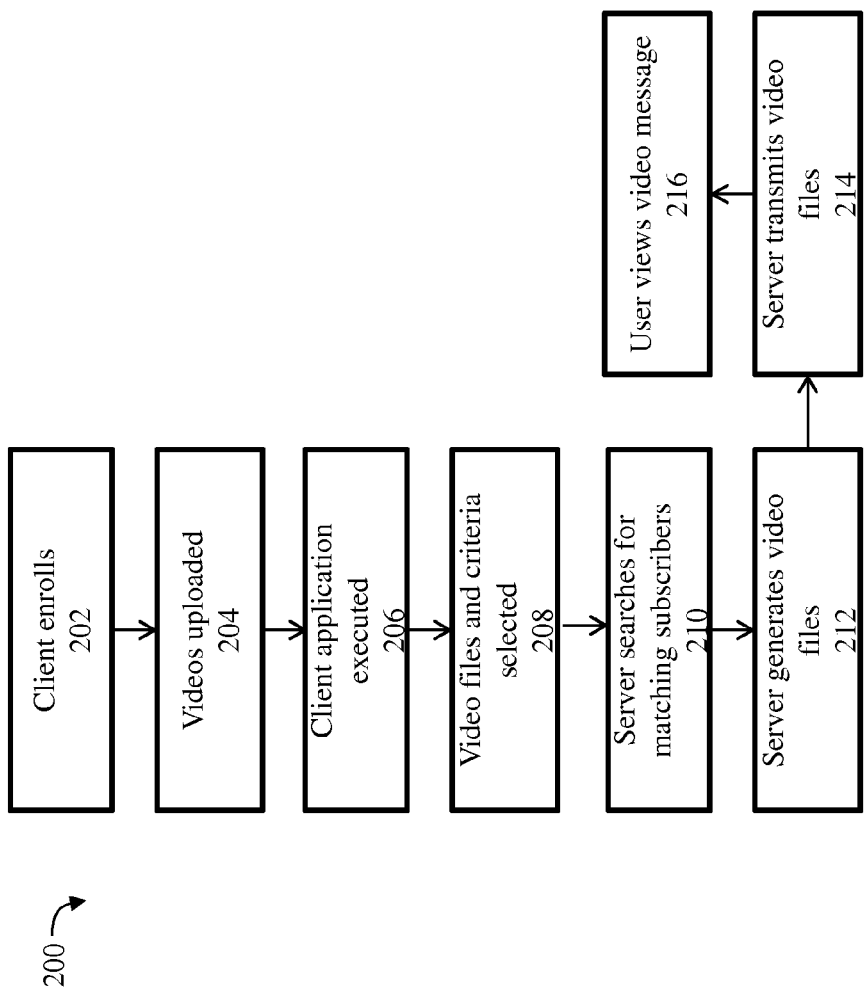
FIG. 2 is a flowchart illustrating the control flow for a process for disseminating a video file to a plurality of mobile subscribers over a mobile communications network, in accordance with one embodiment.
Figure 3A:
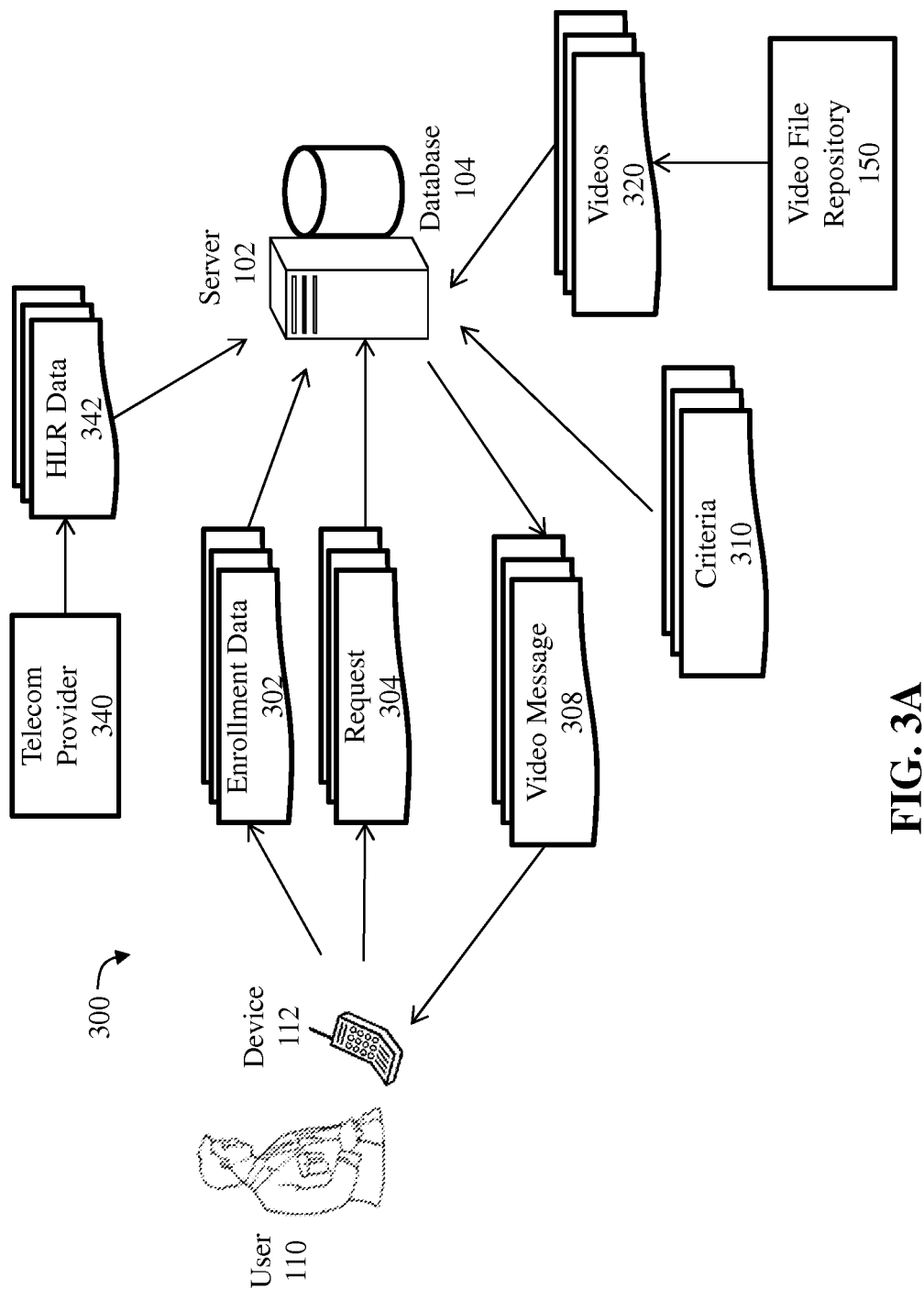
FIG. 3A is a block diagram illustrating the data flow for a system for disseminating a video file to a plurality of mobile subscribers over a mobile communications network, in accordance with one embodiment.
Figure 3B:
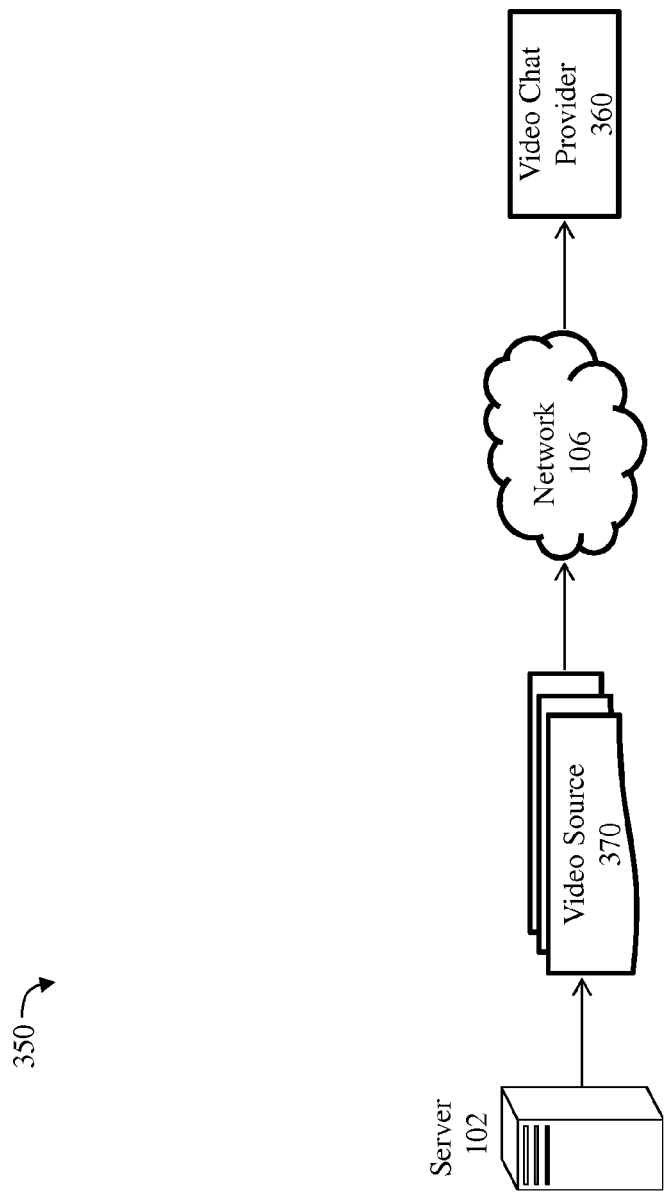
FIG. 3B is a block diagram further illustrating the data flow regarding call data in a system for disseminating a video file to a plurality of mobile subscribers over a mobile communications network, in accordance with one embodiment.

The process for facilitating dissemination of a video file to a plurality of mobile subscribers over a mobile communications network 106 will now be described with reference to FIGS. 2 through 3B below, which provide block diagrams 200, 300 and 350 illustrating the control flow and data flow for a system for facilitating disseminating a video file to a plurality of mobile subscribers over a mobile communications network, in accordance with one embodiment.

In one optional step 202, the process may begin with each user 110, 120 executing an application (such as a mobile app running on the device 112 or 122, wherein said app has been downloaded by the user), so as to begin the process of enrolling with server 102 to be able to receive video files. Enrolling entails the user 110, 120 entering any data that would be stored in a user record or a mobile subscriber record, as defined above. The users 110, 120 may interact with the application via the graphical user interface (GUI) of the application, wherein the users may enter information into the GUI by pressing certain buttons of the devices 112, 122, interacting with the touch pads or touch-screens of the device 112, 122, giving speech commands to devices 112, 122, typing information into the GUI of the application via devices 112, 122, or any combination of the above.

The application then sends any data 302 entered by users 110, 120 to server 102 over the communications network 106, such as via HTTP or generally over IP. A server application running on the server 102 receives the data 302 entered by users 110, 120. A server application running on the server 102 takes the data 302 and, in response, creates a user record or a mobile subscriber record for each user 110, 120, using the data 302 entered by each user. In this step, the server application may further assign each user record a unique identifier and send this unique identifier to each device, wherein the application running on each device 112, 122 stores said unique identifier.

In optional step 204, the third party entity 150 transmits or uploads video files 320 to server 102 for storage in the database 104. The video files may be transmitted to server 102 over the communications network 106, such as via HTTP or generally over IP. A server application running on the server 102 receives the video files and, in response, creates a video file record for each video file.

After the optional enrollment and video upload process, the process may continue with optional step 206 wherein the user 110 executes a client application (such as on the device 112), so as to keep an open line of communication for receiving video files. (Step 206 is optional because if a native video chat platform of the mobile device—such as Apple FaceTime or Google Hangouts or Microsoft Skype—is used, there is no need for the user to execute the application.) In this optional step, the user 110 issues an initiation command to the application via the graphical user interface (GUI) of the application, wherein the command may be given as described above. The application includes an initiation module for sending (from device 112) a validation request 304 to the server 102 over the communications network 106, such as via HTTP, in response to receiving the initiation command from the user 110 via the GUI of the application. The validation request 304 may include a unique identifier for the user 110. This step indicates to the server 102 that the mobile device 112 is ready to receive video files. In one embodiment, step 206 is executed in a situation wherein the user 110 has indicated (in enrollment data 302) that he desires the push technology method of access.

In step 208, a set of video files in database 104 are selected and a criteria 310 for selecting mobile subscribers form the database 104 is defined. An administrator or other person associated with the server 102 or entity 150 may select the video files and provide the data for said criteria. The criteria may include any of the data found in a user record or mobile subscriber record. For example, a criteria may comprise all mobile numbers in the country France that were manufactured by Apple and that run the iOS operating system. In another example, a criteria may comprise all mobile numbers in the country U.S.A. with the H.264 codec and with resolution 1280×720. In yet another example, a criteria may comprise all mobile numbers in the state of Florida with the Facetime native video chat platform, that have indicated push technology as the method of access. In yet another example, a criteria may comprise all mobile numbers wherein the current location of the phone is within a defined area and wherein the previous call to said phone number was successful. Also, in step 208, the HLR data 342 for mobile subscriber 110 may be requested and received from telecommunications provider 340 of the mobile subscriber 110.

Subsequently, in step 210 the server application performs a search of mobile subscriber records and/or user records in database 104 and selects those mobile subscriber records having data members that match the criteria defined in step 208. The result is a group of mobile subscribers.

In step 212, the server application generates, for each mobile subscriber of the group of mobile subscribers, a video message in a format that corresponds to one or more of the data items in the mobile subscriber record for that mobile subscriber. For example, the server application may generate a video message that conforms to the operating system indicator, the video format indicator, the video and audio codecs, the native video chat platform, and the manufacturer indicated in the record for said mobile subscriber. In one embodiment, the server application may generate a video message that conforms to the native video file format indicated in the record for said mobile subscriber In one embodiment, step 212 comprises the server application on server 102 accessing one or more video files selected for transmission to recipients. Then, the server application reads the data items in the mobile subscriber record for each mobile subscriber. Next, if the one or more video files that were accessed do not confirm to the data items in the mobile subscriber record for a mobile subscriber, the server application converts the one or more video files not confirm to the data items. For example, if a data item in the mobile subscriber record for a mobile subscriber indicates that a video file must be in the H.264 codec, and a selected video file does not conform to said codec. The application converts the video file to confirm to the codec.

In one alternative in step 212, the server 102 calculates the best or most optimal video resolution for the video message, for each transmission to each mobile subscriber. The purpose is to provide the best quality video message at the lowest possible bandwidth cost.

In step 214, the server application transmits, to each mobile subscriber of the group of mobile subscribers, via the mobile communications network 106, the corresponding video message 308 that was generated for said mobile phone subscriber. The server application utilizes the mobile phone number of each recipient mobile subscriber (as defined in the corresponding mobile subscriber record) when the corresponding video message is transmitted to said mobile subscriber.

In one embodiment, in step 214, the server application transmits to each mobile subscriber recipient a video message in a manner that corresponds to one or more of the data items in the mobile subscriber record for that mobile subscriber. For example, the server 102 transmits a video message to mobile computing device 112 over network 106, such as via HTTP, according to the method of access indicator in the record for said mobile subscriber. Thus, a video message may be transmitted to a mobile device via push or pull technology. In another example, the server 102 transmits a video message to mobile computing device 112 over network 106, according to any of the following data items in the mobile subscriber record: the protocol for delivering video files, video and audio codecs, the signaling communications protocol, the security protocol, and the protocol for delivering real time and encrypted media streams. In step 216, the user 110 uses a GUI on his device 112 to view the video message that was transmitted from server 102.

In another embodiment, in step 214, the server application transmits to each mobile subscriber recipient a video message using the most optional video resolution that was calculated above.

In yet another embodiment, in step 214, the server application initiates a video chat session with the recipient device 112 of each mobile subscriber recipient of the video message, wherein said video chat session is routed through the video chat provider 360, as described in more detail below. The SIP protocol, for example, may be used to initiate a video chat session. It is through said video chat session that the video message is transmitted to the recipient device 112 of the mobile subscriber recipient. In this alternative, the video message is streamed to the recipient, similar to the manner in which video is streamed during a video chat session.

In one alternative to step 214, the server application generates a video stream source 370 in order to send the video message to each mobile subscriber recipient via a video chat service provider 360. Most native video chat platform of a mobile device (such as Apple FaceTime or Google Hangouts or Microsoft Skype) require that a video chat service provider 360 (normally operated by the company that owns the operating system of the native video chat platform) is used during a video chat session. Thus, the sender 102 and recipient 112 of a video message must interface with the video chat service provider 360 during a video chat session.

Various video chat service providers 360 require the presence of a live video stream from the source or sender of a video message. This requirement ensures that a person is sending the video message, and not a robo-dialer or other automated sender of mass messages, thereby reducing or eliminating spam video messages. In order to compensate for this requirement, the server application creates a video stream source 370 designed to meet the requirement of a live video stream from the source or sender of a video message. Live video streaming requires a form of source media (e.g. a video camera) and an encoder to digitize the content. The video stream source 370 emulates a source media such as a video camera. The video stream may be compressed using a video codec such as H.264 or VP8. Encoded audio and video streams may be assembled in a container bitstream such as MP4. The bitstream may be delivered using a transport protocol, such as RTP.

Recall that in step 210 the server application performs a search of mobile subscriber records and/or user records in database 104 and selects those mobile subscriber records having data members that match the criteria defined in step 208. The result is a group of mobile subscribers. In one embodiment, the group comprises at least 5 million mobile subscribers. Recall that this number of records is significant in the industry because it represents a minimum number of mobile subscribers that are present in a typical medium to large sized urban area, and it represents a minimum number of advertising viewers that must be targeted in an mobile device advertising campaign in order to make the costs of said advertising campaign cost feasible. Thus, in this embodiment, in step 214, the server 102 transmits at least 5 million video messages (at once or in a batch) to the mobile subscribers in the group and in step 216 up to 5 million users view said video messages.

Figure 4:
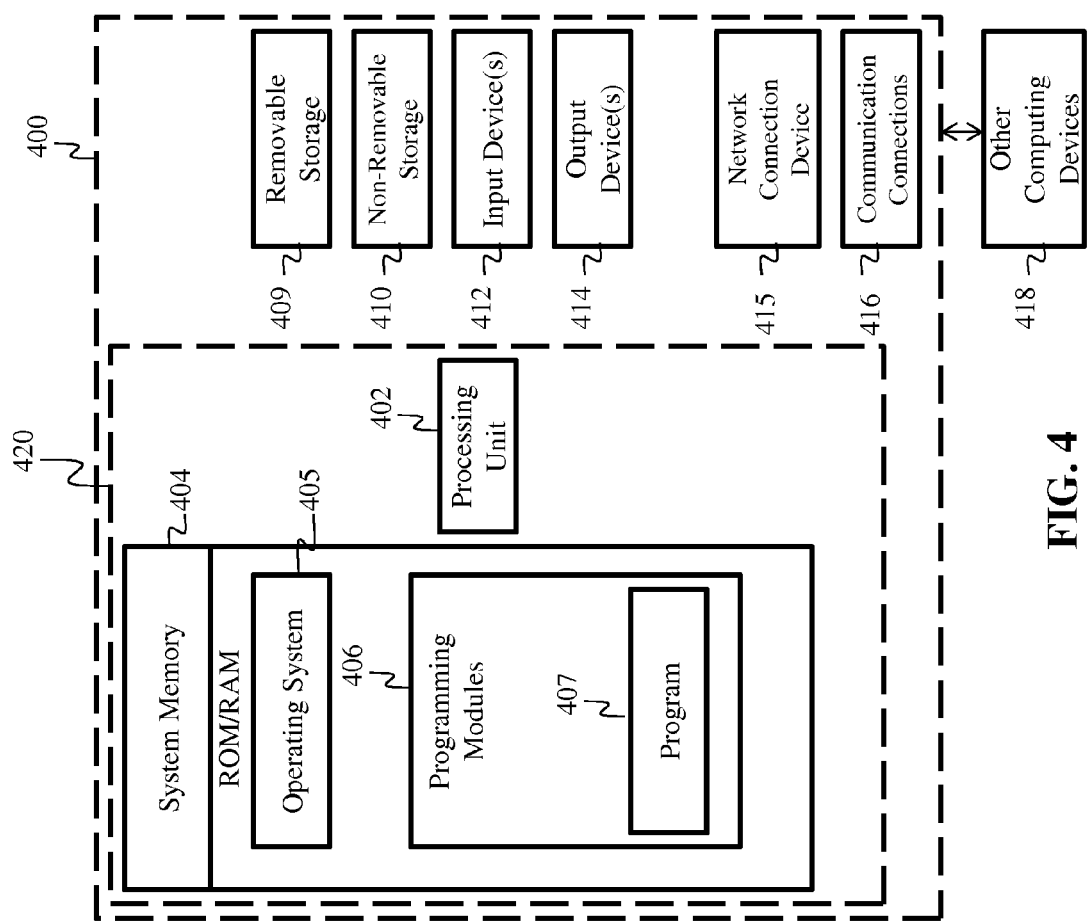
FIG. 4 is a block diagram of a system including an example computing device and other computing devices.

FIG. 4 is a block diagram of a system including an example computing device 400 and other computing devices. Consistent with the embodiments described herein, the aforementioned actions performed by 102, 112, 122 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the methods shown in FIGS. 2-3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods shown in FIGS. 2-3 above. The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A server for disseminating a video file to a plurality of mobile subscribers over a mobile communications network, the server comprising:
   a database storing video files and records of mobile subscribers;
   a memory storage;
   a network connection device communicatively coupled with the mobile communications network;
   a processor communicatively coupled with the database, the memory storage and the network connection device, the processor programmed for:
   (a) storing in an attached database a record for each of the plurality of mobile subscribers, wherein said record includes at least a user name, a mobile phone number, an operating system indicator, a video format indicator, a method of access indicator, HLR (Home Location Register) data, and previous call data, wherein at least 5 million records for mobile subscribers are stored;
   (b) defining a criteria for selecting mobile subscribers for receiving one or more videos from the database, wherein said criteria is based on data from a record for a mobile subscriber;
   (c) selecting a group of mobile subscribers from the plurality of mobile subscribers by identifying the records of said mobile subscribers that match said criteria, wherein the group of mobile subscribers comprises at least 5 million mobile subscribers;
   (d) converting, for each mobile subscriber of the group of mobile subscribers, a video file to a format that corresponds to the operating system indicator and the video format indicator in the record for said mobile subscriber, such that a plurality of converted video files are generated;
   (e) generating, for each mobile subscriber of the group of mobile subscribers, a video message including a corresponding converted video file, such that a plurality of video messages are generated;
   (f) establishing a live video stream source for the plurality of video messages;
   (g) establishing a video chat session with each of the group of at least 5 million mobile subscribers, over the mobile communications network and via a video chat service provider, using the live video stream source as a source for the plurality of video messages; and
   (h) transmitting, to each mobile subscriber of the group of at least 5 million mobile subscribers, via the mobile communications network and the video chat service provider, a corresponding video message of the plurality of video messages to the mobile phone number in the record for said mobile phone subscriber, wherein the video message is transmitted according to the method of access indicator in the record for said mobile subscriber.

2. The server of claim 1, wherein a record for a mobile subscriber record includes demographic data of a user, a protocol for delivering a video file, video and audio codecs, a signaling communications protocol, a security protocol and a protocol for delivering real time and encrypted media streams.

3. The server of claim 2, wherein a record for a mobile subscriber record further includes a native video chat platform, a manufacturer, an industry sector, a country, and a resolution.

4. The server of claim 3, wherein a method of access indicator defines whether a video file may be accepted by a mobile subscriber using either push technology or pull technology.

* * * * *